United States Patent [19]

Donnadieu et al.

[11] Patent Number: 4,604,444

[45] Date of Patent: Aug. 5, 1986

[54] CURABLE ORGANOPOLYSILOXANE COMPOSITIONS COMPRISING MICROENCAPSULATED HARDENING ACCELERATORS

[75] Inventors: André Donnadieu, Lyons; Michel Letoffé, Sainte Foy les Lyon, both of France

[73] Assignee: Rhone-Poulenc Specialites Chimiques, Courbevoie, France

[21] Appl. No.: 662,518

[22] Filed: Oct. 19, 1984

[30] Foreign Application Priority Data

Oct. 19, 1983 [FR] France ................... 83 16614

[51] Int. Cl.⁴ ............................................. C08G 77/04
[52] U.S. Cl. ...................................... 528/34; 524/860;
528/17; 528/18; 528/25; 528/901
[58] Field of Search ................. 528/901, 34, 25, 17, 528/18; 524/860

[56] References Cited

U.S. PATENT DOCUMENTS

| | | | |
|---|---|---|---|
| 3,133,891 | 5/1964 | Ceyzeriat | 528/34 |
| 4,370,160 | 1/1983 | Ziemelis | 524/862 |
| 4,461,854 | 7/1984 | Smith | 524/268 |
| 4,508,888 | 4/1985 | Letoffe et al. | 528/901 |
| 4,528,354 | 7/1985 | McDougal | 528/34 |
| 4,532,315 | 7/1985 | Letoffe et al. | 528/34 |

FOREIGN PATENT DOCUMENTS

| | | |
|---|---|---|
| 0072474 | 7/1982 | European Pat. Off. . |
| 2602176 | 8/1977 | Fed. Rep. of Germany . |
| 1154724 | 6/1969 | United Kingdom . |
| 1181346 | 2/1970 | United Kingdom . |

OTHER PUBLICATIONS

Chemical Abstracts, 106014d, vol. 79, No. 18, (1973).
Chemical Abstracts, 106015e, vol. 79, No. 18, (1973).

*Primary Examiner*—Melvyn I. Marquis
*Attorney, Agent, or Firm*—Burns, Doane, Swecker & Mathis

[57] ABSTRACT

Organopolysiloxane compositions readily cross-linked into elastomers, e.g., elastomeric seals, and advantageously formulated in either one- or two-component packages, are comprised of (A) a polyhydroxylated polysiloxane, (B) a polyacyloxysilane cross-linking agent and (C) a hardening accelerator therefor, said hardening accelerator being protectively microencapsulated within impermeable outer skin membranes adopted to be chemically or physically disrupted, e.g., by heat, irradiation or mechanical breaking, to permit the release of said accelerator (C) therefrom and consequent curing of the composition.

13 Claims, No Drawings

CURABLE ORGANOPOLYSILOXANE COMPOSITIONS COMPRISING MICROENCAPSULATED HARDENING ACCELERATORS

BACKGROUND OF THE INVENTION

1. Field of the Invention:

The present invention relates to organopolysiloxane compositions comprising polyacyloxysilanes and encapsulated hardening accelerators, and to means for the curing or hardening of such compositions into elastomers.

2. Description of the Prior Art:

The organopolysiloxane/polyacyloxysilane compositions, in contrast to the known one-component compositions which also comprise acyloxy radicals bonded to silicon atoms (described in particular in French Pat. Nos. 1,198,749, 1,220,348, 2,429,811 and published French Patent Application No. 82/13,505, filed July 30, 1982), are not storage stable, but their cross-linking time is much shorter, for example, on the order of a few minutes up to 60 minutes. They must, therefore, be prepared as and when required.

The rapidly cross-linking compositions of the above type, in which the cross-linking is independent of the degree of humidity of the surrounding atmosphere, are used in fields of application where this property is especially useful, such as, for example, the manufacture of seals "in situ" in the automobile industry. Compositions of the above type, comprising acyloxy radicals bonded to silicon atoms and having a cross-linking time independent of the humidity of the ambient air, are described, for example, in British Patent Specification No. 1,308,985, which features a hardening process which consists of adding to the subject compositions from 3 to 15% of a hardening accelerator comprising a silico-aluminate which has from 5 to 10% by weight of adsorbed water, with a view towards manufacturing silicone elastomer moldings by low pressure injection.

In published French Patent Applications Nos. 83/01,504 and 83/01,505, filed Jan. 27, 1983, compositions are described which are also of the foregoing type, but in which the hardening accelerator is selected, respectively, from among an alkali metal hydroxide and alkaline earth metal hydroxide, or is alternatively a mixture consisting of water and a phosphate and/or a polyphosphate of an alkali metal or of an alkaline earth metal.

The accelerators described in the immediately aforesaid two French patent applications have enabled very significant progress to be made, relative to the teachings of British Pat. No. 1,308,985, in the sense that, on the one hand, the nature and quantities of accelerators introduced do not modify the mechanical properties of the resultant elastomer and, on the other hand, these accelerators have offered the possibility of using compositions of such type for glueing or mating parts which are circulating on industrial assembly lines where there are no storage areas available for them in which their complete hardening could be assured.

However, the compositions described in the '985 British patent and the two published French patent applications cannot be singly packaged (one-component compositions) and must be packaged as two components, typically the organopolysiloxane as one component and the accelerator on the other, since the mixing of these two components must be done as and when required, namely, at the point in time of use.

This procedure is fraught with disadvantages. First, there is naturally the risk that at the time of use the respective proportions of the two components are not measured out correctly. Furthermore, especially in the case of the automatic manufacturing of "formed" or "in situ" seals, the mixing is carried out in an automatic apparatus for depositing the compositions, and comprising a mixing head which receives the polysiloxane composition and the accelerator. It is then necessary that the compositions used in this apparatus have a well regulated hardening time to avoid the mixture solidifying in the mixing head, and this requires long and critical optimization trials. Furthermore, it is necessary to empty these mixing heads when the apparatus is stopped or has broken down, to avoid solidification occurring.

SUMMARY OF THE INVENTION

Accordingly, a major object of the present invention is the provision of improved organopolysiloxane compositions which are rapidly hardened into elastomers, but which otherwise obviate those disadvantages and drawbacks to date characterizing the state of this art.

Briefly, the present invention features novel organopolysiloxane compositions comprising a polyacyloxysilane component which can harden very rapidly into elastomers in the presence of an accelerator containing and/or generating water, which compositions can in certain instances be formulated in the form of a one-component composition, namely, in a single package which is storage stable and already contains the hardening accelerator.

Another object of the present invention is the provision of an organopolysiloxane composition of the above type, the cross-linking of which to elastomer is independent of the degree of humidity of the surrounding atmosphere and can be performed rapidly and triggered at any desired moment, either by mixing the organopolysiloxane component with the accelerator, optionally followed by an appropriate heat or mechanical treatment in the case of two-component compositions, or by only appropriate heat and/or mechanical treatment in the case of one-component compositions (in a single package), which permits the avoidance of, in this latter case, premature solidification of the composition and/or an error in measuring out the accelerator or organopolysiloxane composition when it is used.

A still further object of the present invention is the provision of an organopolysiloxane composition which can be a one-component composition and which is more especially suitable for forming, in particular on automatic apparatus, "in situ" seals used in the automobile industry, which seals do not suffer from the risk of solidifying, due to the fact that there is greater control over the triggering of the cross-linking reaction.

The improved organopolysiloxane compositions according to this invention, which can be facilely cross-linked into elastomers, comprise a polyhydroxylated polysiloxane (A), a polyacyloxysilane (B) and a hardening accelerator (C), said hardening accelerator (C) being microencapsulated within an impermeable skin membrane, the said skin membrane no longer being impermeable when subjected to a suitable heat treatment and/or suitable irradiation and/or a suitable mechanical treatment.

The compositions according to the invention can additionally comprise from 1 to 150 parts of an inorganic filler material (D) per 100 parts of the constituent (A).

Unless otherwise indicated, all parts and percentages are by weight.

DETAILED DESCRIPTION OF THE INVENTION

More particularly according to the present invention, the subject organopolysiloxane compositions which can be cross-linked to form an elastomer advantageously comprise:

(A) 100 parts of α,ω-di(hydroxy)diorganopolysiloxane polymers having a viscosity of 700 to 1,000,000 mPa.s at 25° C., comprising recurring diorganosiloxy units of the formula $R_2SiO$, in which the symbols R, which may be identical or different, represent hydrocarbon radicals having from 1 to 8 carbon atoms, which radicals may or may not be substituted by halogen atoms or cyano groups;

(B) 2 to 20 parts of cross-linking agents of the general formula $R_pSi(OCOR')_{4-p}$, in which the symbol R has the meaning given under (A), the symbol R' represents a hydrocarbon radical devoid of aliphatic unsaturation and having from 1 to 15 carbon atoms and the symbol p represents zero or one; and (C) 0.01 to 7 parts, per 100 parts of (A)+(B)+(C), of a hardening accelerator microencapsulated within a skin membrane impermeable thereto, said skin losing its characteristic of impermeability after approprite heat and/or mechanical treatment in order to release the constituent (C) therefrom.

The polymers (A), having a viscosity of 700 to 1,000,000 mPa.s at 25° C., preferably of 1,000 to 700,000 mPa.s at 25° C., are essentially linear polymers comprising diorganosiloxy units of the above-mentioned formula $R_2SiO$ and blocked at each end of their chain by a hydroxyl group; however, the presence of monoorganosiloxy units of the formula $RSiO_{1.5}$ and/or of siloxy units of the formula $SiO_2$, in a proportion of at most 2% relative to the number of diorganosiloxy units, is also within the ambit of this invention.

The hydrocarbon radicals which have from 1 to 8 carbon atoms and may or may not be substituted by halogen atoms or cyano groups, and which are represented by the symbols R, are advantageously selected from among:

(i) the alkyl and halogenoalkyl radicals having from 1 to 8 carbon atoms, such as the methyl, ethyl, n-propyl, isopropyl, n-butyl, n-pentyl, n-hexyl, 2-ethylhexyl, n-octyl, 3,3,3-trifluoropropyl, 4,4,4-trifluorobutyl, 4,4,4,3,3-pentafluorobutyl radicals;

(ii) the cycloalkyl and halogenocycloalkyl radicals having from 4 to 8 carbon atoms, such as the cyclopentyl, cyclohexyl, methylcyclohexyl, 2,3-difluorocyclobutyl, 3,4-difluoro-5-methyl-cycloheptyl radicals;

(iii) alkenyl radicals having from 2 to 4 carbon atoms, such as the vinyl, allyl, 2-butenyl radicals;

(iv) the aryl and halogenoaryl radicals having from 6 to 8 carbon atoms, such as the phenyl, tolyl, xylyl, chlorophenyl, dichlorophenyl, trichlorophenyl radicals; and (v) the cyanoalkyl radicals in which the alkyl moieties have from 2 to 3 carbon atoms, such as the β-cyanoethyl and γ-cyanopropyl radicals.

Exemplary of the units represented by the formula $R_2SiO$, those having the following formulae are representative:

$(CH_3)_2SiO$ $CH_3(CH_2=CH)SiO$ $CH_3(C_6H_5)SiO$ $(C_6H_5)_2SiO$ $CF_3CH_2CH_2(CH_3)SiO$ $NC-CH_2CH_2(CH_3)SiO$ $NC-CH(CH_3)CH_2(CH_2=CH)SiO$ $NC-CH_2CH_2CH_2(C_6H_5)SiO$

It will be appreciated, in one embodiment of the invention, that as polymers (A) there can be used copolymers or a mixture comprised of polymers of α,ω-di(hydroxy)diorganopolysiloxanes which differ from each other in molecular weight and/or the nature of the groups bonded to the silicon atoms.

These α,ω-di(hydroxy)diorganopolysiloxane copolymers (A) are commercially available; furthermore, they are readily prepared. One of the most typical techniques for preparation thereof comprises, in a first phase, of polymerizing diorganocyclopolysiloxanes in the presence of catalytic amounts of alkaline or acidic agents, and then treating the polymerizates with calculated amounts of water (French Pat. Nos. 1,134,005, 1,198,749, 1,226,745); this addition of water, which is higher in proportion that the polymers to be prepared have a lower viscosity can be replaced in whole or in part by α,ω-di(hydroxy)diorganopolysiloxane oils of low viscosity, for example, ranging from 5 to 200 mPa.s at 25° C., and having a high proportion of hydroxyl radicals, for example, from 3 to 14%.

The cross-linking agents (B) are used in the proportion of 2 to 20 parts, preferably from 3 to 15 parts, per 100 parts of the α,ω-di(hydroxy)diorganopolysiloxane polymers (A).

Same correspond to the above-mentioned formula $R_pSi(OCOR')_{4-p}$ in which, as above-indicated, the symbol R has the significance given under (A), the symbol R' represents an aliphatic hydrocarbon radical devoid of unsaturation and having from 1 to 15 carbon atoms, and the symbol p represents zero or 1.

Specific examples have already been given regarding the nature of the radicals represented by the symbol R. As for the symbol R', it advantageously represents a radical selected from among the following:

(i) alkyl radicals having from 1 to 15 carbon atoms, such as the methyl, ethyl, n-propyl, n-butyl, n-pentyl, 1-ethylpentyl, n-hexyl, 2-ethylhexyl, n-octyl, neodecyl, n-decyl, n-dodecyl, n-pentadecyl radicals;

(ii) cycloalkyl radicals having from 5 to 6 nuclear carbon atoms, such as the cyclopentyl and cyclohexyl radicals; and (iii) aryl radicals having from 6 to 8 carbon atoms such as the phenyl, tolyl, xylyl radicals.

By way of specific examples of the cross-linking agents (B), representative are those which have the following formulae:

$CH_3Si(OCOCH_3)_3$ $C_2H_5Si-(OCOCH_3)_3$ $CH_2=CHSi(OCOCH_3)_3$ $C_6H_5Si-(OCOCH_3)_3$ $CH_3Si\{OCOCH(C_2H_5)(CH_2)_3-CH_3\}_3$ $CF_3CH_2CH\ Si(OCOC_6H_5)_3$ $CH_3Si(OCOC_6H_5)_3$ $CH_3Si(OCOCH_3)_2OCOCH-(CH_2)_3CH_3$
$\quad\quad\quad\quad\quad\quad\quad\quad\quad\quad\ |$
$\quad\quad\quad\quad\quad\quad\quad\quad\quad\quad C_2H_5$ $CH_3COOSi\{OCOCH-(CH_2)_3CH_3\}_3$
$\quad\quad\quad\quad\quad\quad\quad |$
$\quad\quad\quad\quad\quad\quad\quad C_2H_5$ It will also be appreciated that the constituents (A) and (B) in the compositions of the invention can be replaced by materials freed of the volatiles generated by the stoichiometric reaction of (A) with (B), according to the process described in French Pat. No. 1,220,348.

With the cross-linking agents (B), there can be associated silanes, each bearing only two hydrolyzable groups; these silanes have the formula:

$$R''_2Si(OCOR')_2$$

in which the symbols R' are defined as was the symbol R' in the formula:

$$R_pSi(OCOR')_{4-p}$$

and the symbols R'' are defined as was the symbol R in this same formula or represent a tert-butoxy radical of the formula $(CH_3)_3C-O-$.

Exemplary of such silanes, representative are those of the following formulae:

$(CH_3)_2Si(OCOCH_3)_2$ $CH_2=CH(CH_3)Si(OCOCH_3)_2$ $(C_6H_5)_2Si(OCOCH_3)_2$ $\{(CH_3)_3C-O\}_2Si(OCOCH_3)_2$ $(CH_3)_2Si\{OCOCH(C_2H_5)(CH_2)_3CH_3\}_2$ $\{(CH_3)_3CO\}_2Si\{OCOCH(C_2H_5)(CH_2)_3CH_3\}_2$

The molar amount used of the silanes of the formula:

$$R''_2Si(OCOR')_2$$

relative to that used of the cross-linking silanes (B) of the formula:

$$R_pSi(OCOR')_{4-p}$$

is not narrowly defined, but it is nevertheless necessary that its upper limit should be such that the mixture of the two types of silanes always contains on average at least 2.5-OCOR' groups for each atom of silicon.

Thus, taking, for example, 1 mole of the cross-linking silane (B) of formula $RSi(OCOR')_3$ (with p=1), at most 1 mole of the silane $R''_2Si(OCOR')_2$ must be associated therewith. Likewise, taking 1 mole of the cross-linking silane (B) of formula $Si(OCOR')_4$ (with p=0), at most 3 moles of silane $R''_2Si(OCOR')_2$ must be associated therewith.

The principal function of the silanes of the formula $R''_2Si(OCOR')_2$ is that of coupling the chains of the $\alpha,\omega$-di(hydroxy)diorganopolysiloxane polymers (A), and this enables elastomers having good physical characteristics to be obtained from compositions containing polymers (A), the viscosity of which is relatively low, for example, ranging from 700° to 5,000 mPa.s at 25° C.

The hardening accelerator which is used according to the present invention is a material containing and/or generating water by chemical reaction when it is placed in contact with the polyacyloxysilane (B).

Representative hardening accelerators are, in particular, zinc oxide, as described in French Pat. No. 1,193,721, a silico-aluminate, as described in British Patent Specification No. 1,308,985, an alkali metal hydroxide or alkaline earth metal hydroxide which may be either anhydrous or hydrated, as described in published French Patent Application No. 83/01,504, filed Jan. 27, 1983, or alternatively water and a phosphate and/or a polyphosphate of an alkali metal or of an alkaline earth metal, as described in published French Patent Application No. 83/01,505, filed Jan. 27, 1983.

The constituent (C) comprising the subject compositions is present within microcapsules which are formed from an impermeable skin.

By "impermeable skin", there is intended a skin through which the constituents (A), (B) and (C) cannot diffuse, migrate or infiltrate in either direction. Thus, the constituent (C) which is enclosed within the microcapsule cannot pass through the skin and react with the constituent (B), and vice versa. The material which serves to form the skin is selected from among materials which are chemically compatible with the accelerator (C), which are able to form an impermeable skin around a particle of the accelerator (C) and which are no longer impermeable after "a heat treatment", namely, heating generally between 50 and 200° C., a treatment by irradiation with HF electromagnetic, microwave, infrared or ultraviolet radiation and/or after a mechanical treatment, such as, for example, grinding or crushing, these treatments being adopted for melting and/or decomposing and/or breaking up the skin, for example.

Exemplary of such skin materials are polystyrene, acrylonitrile/styrene copolymers, polyvinyl chloride (PVC), polyvinyl dichloride (PVDC), a polyvinyl chloride/polyvinyl dichloride copolymer, ethylcellulose, cellulose nitrate, methyl polymethacrylate, epoxide resins, polysulfones, polycarbonates and polyimides.

The size of the microcapsules typically varies from 1 to 500 μm. However, to ensure satisfactory dispersion of the constituent (C) in the constituents (A) and (B), such size preferably ranges from 5 to 200 μm.

The encapsulation of the accelerator (C) within a microcapsule formed from an impermeable skin can be effected by chemical, physicochemical, physical and mechanical means, for example, the coacervation process described in U.S. Pat. No. 3,341,416 and French Pat. No. 1,304,561, the interfacial polymerization process described in French Pat. 2,413,123, the in situ polymerization process described in U.S. Pat. No. 3,330,693 and the process involving drying in a liquid described in French Pat. No. 1,362,933.

The compositions according to the invention can also contain, per 100 parts of the $\alpha,\omega$-di(hydroxy)diorganopolysiloxane polymers (A), from 1 to 150 parts, and preferably from 5 to 120 parts, of inorganic fillers (D).

These fillers can take the form of very finely divided materials having an average particle diameter of less than 0.1 μm. Among these fillers (D) are included the pyrogenic silicas and precipitated silicas; their specific surface is generally greater than 40 m²/g, and is most often in the range 150-200 m²/g.

If the anhydrous or hydrated hydroxides of alkali metals or of alkaline earth metals are employed as accelerators (C), they are typically used in amounts of 0.01 to 7 parts, and preferably from 0.05 to 5 parts, per 100 parts of the sum of the weights of the constituents (A), (B) and (D). They are preferably selected from among the hydroxides of lithium, barium, strontium and calcium, and may be anhydrous or hydrated. These hydroxides in the anhydrous state have the formulae: LiOH, Ba(OH)$_2$, Sr(OH)$_2$, Ca(OH)$_2$.

If a mixture consisting of water and a phosphate and/or a polyphosphate of an alkali metal or of an alkaline earth metal is employed as accelerator (C), it is typically used in amounts of 0.01 to 7 parts, and preferably from 0.05 to 5 parts, per 100 parts of the sum of the weights of the constituents (A), (B) and (D). The phosphate and/or polyphosphate present in the accelerator mixture is preferably a salt in which the cation is selected from among potassium, sodium, calcium or magnesium.

If a sodium aluminosilicate having an adsorbed water content of 5 to 15% by weight is employed as the accelerator (C), it is used in an amount of 3 to 15% by weight relative to the total weight of (A), (B) and (D).

If zinc oxide is used, from 2 to 40 parts by weight of zinc oxide can be used per 100 parts by weight of the silicone composition.

The organopolysiloxane compositions according to the invention can also comprise, although not necessarily, in addition to the constituents (A), (B), (C) and (D), hardening catalysts which are typically selected from among the following:

(i) metal salts of carboxylic acids, preferably organo-tin salts of carboxylic acids, such as dibutyltin diacetate and dibutyltin dilaurate;

(ii) products of reaction of organotin salts of carboxylic acids with titanic acid esters (U.S. Pat. No. 3,409,753); and (iii) organic derivatives of titanium and of zirconium, such as the titanic acid and zirconic acid esters (published French Patent Application No. 82/13,505, filed July 30, 1982).

These hardening catalysts are typically used in amounts of 0.0004 to 6 parts, and preferably from 0.0008 to 5 parts, per 100 parts of the α,ω-di(hydroxy)diorganopolysiloxane polymers (A).

The organopolysiloxane compositions can also incorporate the usual adjuvants and additives, especially the heat stabilizers. These latter materials which, by their presence, improve the heat resistance of the silicone elastomers, are advantageously selected from among the salts, oxides and hydroxides of the rare earths (and more especially from among cerium oxides and hydroxides) or from among the oxides of titanium and of iron, preferably obtained by combustion.

In addition to the principal constituents (A), (B), (C), (D) and the above-mentioned additives, particular organopolysiloxane compounds can be introduced for the purpose of affecting the physical characteristics of the compositions according to the invention and/or affecting the mechanical properties of the elastomers which result from the hardening of these compositions.

These organopolysiloxane additives are well-known; they include, more especially:

(1f) α,ω-bis(triorganosiloxy)diorganopolysiloxane and/or α-hydroxy-ω-(triorganosiloxy)diorganopolysiloxane polymers, having viscosities of at least 10 mPa.s at 25° C., consisting essentially of diorganosiloxy units and at most 1% of monoorganosiloxy and/or siloxy units, the organic radicals bonded to the silicon atoms being selected from among the methyl, vinyl or phenyl radicals, at least 60% of these organic radicals being methyl radicals and at most 10% being vinyl radicals. The viscosity of these polymers may reach several tens of millions of mPa.s at 25° C.; they therefore include oils with a fluid to viscous appearance and soft to hard gums. They are prepared according to the usual techniques described in greater detail in French Pat. Nos. 978,058, 1,025,150, 1,108,764 and 1,370,884. Preferably, α,ω-bis(trimethylsiloxy)dimethylpolysiloxane oils having a viscosity ranging from 10 mPa.s to 1,000 mPa.s at 25° C. are used. These polymers, which serve as plasticizers, may be added in an amount of at most 150 parts, preferably from 5 to 120 parts, per 100 parts of α,ω-di(hydroxy)diorganopolysiloxane polymers (A);

(2f) branched, liquid methylpolysiloxane polymers having from 1.4 to 1.9 methyl radicals per silicon atom, comprising a combination of units of the formulae:

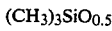

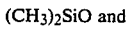

and containing from 0.1 to 8% of hydroxyl groups. Same can be prepared by hydrolysis of the corresponding chlorosilanes as described in French Pat. Nos. 1,408,662 and 2,429,811. Preferably, branched polymers are used whose units are distributed according to the following ratios:

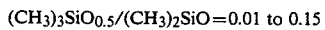

and

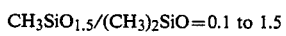

These polymers may be added in an amount of at most 70 parts, preferably 3 to 50 parts, per 100 parts of α,ω-di(hydroxy)diorganopolysiloxane polymers (A). They confer thixotropic properties, particularly with the modified silicas.

(3f) diorganopolysiloxane oils blocked with hydroxyl groups and/or lower alkoxy groups having from 1 to 4 carbon atoms, with a low viscosity generally in the range 2 mPa.s to 4,000 mPa.s at 25° C. (if these oils are blocked only with hydroxyl groups, their viscosity is below 700 mPa.s at 25° C.); the organic radicals bonded to the silicon atoms of these oils are, as before selected from among the methyl, vinyl or phenyl radicals, at least 40% of these radicals being methyl radicals and at most 10% being vinyl radicals. As chain-blocking lower alkoxy groups, representative are the methoxy, ethoxy, isopropoxy, n-propoxy, n-butoxy, isobutoxy and tertiary butoxy groups. The contents of hydroxyl and/or alkoxy groups typically range from 0.5 to 20%. These oils are prepared according to the usual techniques described in greater detail in French Pat. Nos. 938,292, 1,104,674, 1,116,196, 1,278,281 and 1,276,619. Preferably, α,ω-dihydroxydimethylpolysiloxane oils having a viscosity of 10 to 300 mPa.s at 25° C., α,ω-dihydroxymethylphenylpolysiloxane oils having a viscosity of 200 to 600 mPa.s at 25° C., or α,ω-dimethoxy-(or -diethoxy-)dimethylpolysiloxane oils having a viscosity of 30 to 2,000 mPa.s at 25° C., are used. They may be added in an amount of at most 50 parts, preferably 2 to 40 parts, per 100 parts of α,ω-di(hydroxy)diorganopolysiloxane polymers (A). These oils make it possible to reduce overall viscosity and are considered, as is known to this art, as process aids.

(4f) hydroxylated organosilicon compounds selected from the compounds corresponding to the general formula

Z'SiZ$_2$(OSiZ$_2$)$_w$OH, which are solid at ambient temperature. In this formula, the symbols Z, which may be identical or different, denote methyl, ethyl, n-propyl, vinyl or phenyl radicals; the symbol Z' denotes a hydroxyl radical or Z, and the symbol w is zero, 1 or 2. As specific examples of these compounds, representative are: diphenylsilanediol, methylphenylsilanediol, dimethylphenylsilanol, 1,1,3,3-tetramethyldisiloxanediol, 1,3-dimethyl-1,3-diphenyldisiloxanediol or 1,1,5,5-tetramethyl-3,3-diphenyltrisiloxanediol. They may be added in an amount of at most 30 parts, preferably 0.5 to 20 parts, per 100 parts of αω-di(hydroxy)diorganopolysiloxane polymers (A). They confer thixotropic properties to the medium, which generally is slightly gelled by their action. The α,ω-bis(triorganosiloxy)diorganopolysiloxane and/or α-hydroxy-ω-(triorganosiloxy)diorganopolysiloxane polymers described under (1f) may be replaced, wholly or partially, with organic compounds which are unreactive towards the constituents (A), (B), (C) and (D) and which are miscible at least with the α,ω-di(hydroxy)diorganopolysiloxane polymers (A). As specific examples of these organic compounds, representative are the polyalkylbenzenes obtained by alkylation of benzene with long-chain olefins, particularly olefins having 12 carbon atoms originating from the polymerization of propylene. Organic compounds of this type are described, for example, in French Pat. Nos. 2,392,476 and 2,446,849.

The compositions according to the invention optionally may be used after dilution in liquid organic compounds provided that such compounds do not dissolve or disrupt the skin of the microcapsules, the diluents preferably being common commercially available products selected from among:

(i) optionally halogenated, aliphatic, cycloaliphatic or aromatic hydrocarbons, such as n-heptane, n-octane, cyclohexane, methylcyclohexane, toluene, xylene, mesitylene, cumene, tetralin, perchloroethylene, trichloroethane, tetrachloroethane, chlorobenzene or orthodichlorobenzene;

(ii) aliphatic and cycloaliphatic ketones, such as methyl ethyl ketone, methyl isobutyl ketone, cyclohexanone or isophorone; and (iii) esters, such as ethyl acetate, butyl acetate or ethylglycol acetate.

The formulation of the compositions of the invention can also be carried out in two stages. According to this technique, which is also an object of this invention, compositions are first prepared by mixing, in the absence of moisture, the constituents (A), (B) and (D), and optionally the conventional additives and adjuvants.

These are stable on storage and harden only on exposure to moist air. Naturally, such compositions could, if appropriate, be employed alone and their hardening or cross-linking would then develop starting from the surfaces in contact with the surrounding air and proceed progressively towards the interior of the mixture. The time for their complete hardening would be relatively lengthy and would depend chiefly on the thickness of the layers deposited and on the humidity of the atmosphere surrounding the compositions. Generally, a period of 24 hours would thus be required at ambient temperature, with a humidity of 60%, to properly cross-link a layer 4 mm in thickness.

In a second stage, the hardening accelerators (C), which have been previously microencapsulated, are added to the first stage compositions and then homogenized.

One-component compositions are thus obtained, the stability of which can range from a few hours to several months, or even to more than a year, depending upon the nature and degree of impermeability of the skin.

To induce or accelerate the hardening of these compositions, it suffices to subject them to a heat treatment and/or mechanical treatment to disrupt or render the skin of the microcapsules permeable.

The compositions thus treated must then be rapidly used, since their hardening, in contrast to that of the conventional one-component compositions, develops throughout their bulk. The time for their complete hardening is very variable, given that it depends upon the nature and the amounts of the accelerators (C) employed, upon the presence or absence of water and upon the form in which this water is introduced. By varying these different parameters, it is possible to obtain hardening times which range from a few minutes to 60 minutes or longer. The temperature is also an important parameter; in fact, variations in the temperature level have a very clear effect on the rate of hardening If the temperature increases (the variations are positive), the hardening time is shortened; in the opposite case the time is lengthened.

Thus, reductions in hardening times of one half, and sometimes much more, can be obtained by exposing compositions to temperatures ranging, for example, from 50° to 200° C. instead of maintaining them at room temperature, that is to say, in the range 15°-25° C., after carrying out a simple mechanical treatment, e.g., crushing, to break up the microcapsules.

If the cross-linking is carried out at a temperature of from 50° to 150° C., it is of course then necessary to use a material for the skin of the microcapsules which does not give rise to decomposition products which adversely affect the final elastomer, such as would occur with, for example, PVC or PVC/PVDC copolymer. Nevertheless, these materials can be used for applications in which the cross-linking and the conditions of use of the elastomer take place at ambient temperature. On the other hand, other materials such as polystyrene do not adversely affect the mechanical properties of the elastomer when hot. This adverse effect, which can also originate from the nature and amount of the hardening agent (C), can be assessed in a very satisfactory manner by the CS (compression set) test. This test consists of heating for several hours (for example, 72 hours at 150° C.) an elastomer sample maintained under compression which decreases the height of the sample by 30%, and measuring the permanent deformation in terms of the percentage decrease in thickness of the sample after the test.

Another object of the present invention consists of the use of the aforedescribed quick-hardening compositions to obtain seals.

The compositions according to the invention may be employed for many applications, such as sealing in the building industry, the assembly of the most diverse materials (metals, plastics, natural and synthetic rubbers, wood, cardboard, crockery, brick, ceramics, glass, stone, concrete, masonry components), the insulation of electrical conductors, the coating of electronic circuits, or the preparation of molds employed in the manufacture of objects from synthetic resins or foams.

Furthermore, they are more especially suitable for the production of "in situ" seals employed in the automobile industry. These "in situ" seals encompass several types, namely "crushed" seals, "formed" seals and "injected" seals.

The "crushed" seals are formed following the application of a pasty ribbon of the compositions to the zone of contact between two metal elements to be assembled. The pasty ribbon is first deposited on one of the components and then the other component is immediately applied to the first. This results in a crushing of the ribbon before it is converted into elastomer; this crushing can break open the microcapsules, thereby bringing about the cross-linking of the composition, optionally without further treatment. This type of seal is applicable to assemblies which usually do not need to be taken apart (oil sump seals, engine front end cover seals, etc.).

The "formed" joints are also obtained following the application of a pasty ribbon of the compositions to the zone of contact between two components to be assembled. However, after the deposition of the pasty ribbon on one of the components, complete hardening of the ribbon into elastomer is induced, for example, by heating, and the second component is applied to the first only after this time. As a result, such an assembly can be easily taken apart since the component which is applied to that which has received the seal does not adhere to this seal. Furthermore the seal, by virtue of its rubbery nature, adapts to all the irregularities of the surfaces to be sealed and, for this reason, there is no need (1) to machine carefully the metal surfaces which are to be placed in contact with each other, and (2) to clamp under pressure the assemblies which are obtained; these factors make it possible to eliminate, to some extent, fixing seals, spaces, or ribs which are usually intended to stiffen and strengthen the components of such assemblies.

Since the compositions according to the invention can harden rapidly even at ambient temperature after crushing and/or melting the microcapsules, in the presence or the absence of moisture, in an enclosed environment or in free air, it follows that the "formed" seals (and also the other "in situ" seals) resulting from the hardening of these compositions can be produced under highly restricting conditions. They can, for example, be produced on the conventional assembly lines in the automobile industry, which lines are equipped with an automatic apparatus for depositing the compositions. This automatic apparatus very frequently has a mixer head equipped with a deposition nozzle, the latter moving along the outline of the seals to be produced. The mixing head can receive the polysiloxane composition incorporating the microencapsulated accelerator, and can also have a third inlet allowing the introduction of a solvent for washing the equipment after use (cyclohexane, etc.). The cross-linking can then be induced by suitable heating of the deposited ribbon or seal.

The compositions produced and distributed by means of this apparatus must have a closely controlled hardening time, on the one hand to avoid solidification in the mixer head, and on the other hand to obtain complete cross-linking after completion of the deposition of the pasty ribbon onto the parts to be sealed. According to the invention, this solidification can be avoided as a result of the microencapsulation. These "formed" seals are more especially suitable for the seals of rocker covers, gearbox covers, timing covers and even oil sumps.

The injected seals, the cross-linking of which has been previously induced, are formed in an enclosed environment, often in cavities which are completely closed. The compositions placed in these cavities are rapidly converted into elastomers, the properties of which are identical to those of elastomers resulting from hardening of the compositions in free air. These seals can ensure, for example, the sealing of crankshaft bearings.

The compositions according to the invention are also suitable for the production of quick-hardening seals in areas other than automotive. They can thus serve to glue and to seal electrical switchboxes made of plastic, and to produce seals for vacuum cleaners and for steam irons.

The elastomers formed by hardening the compositions according to the invention have mechanical properties which are substantially similar to those of elastomers produced from known one-component compositions, namely, the compositions formed by simple mixing of the constituents (A), (B) and (D) and, optionally, conventional additives without the introduction of the accelerators (C). In particular, the compression sets can be relatively low, for example, on the order of 8 to 35%. Furthermore, complete cross-linking measured by Shore A hardness is obtained immediately upon completion of the cross-linking times mentioned earlier, which generally range from a few minutes to 60 minutes, sometimes longer but never more than 3 hours. In the case of one-component compositions, complete cross-linking requires, under the most favorable conditions, at least ten hours or thereabouts.

In order to further illustrate the present invention and the advantages thereof, the following specific examples are given, it being understood that same are intended only as illustrative and in nowise limitative.

EXAMPLE 1

In an Erlenmeyer flask, 12.5 g of GEDEX ® polystyrene, marketed by CDF Chimie, were dissolved in 125 cm$^3$ of dichloromethane. 10 g of slaked lime [Ca(OH)$_2$], in the form of a very fine powder having a particle size of approximately 10 μm, were added to this solution, and intimately admixed therewith (slaked lime powder, standard quality, marketed by the French company Balthazard).

10 g of casein were dissolved in 1 liter of aqueous caustic soda (pH approximately 13) in a crystallizing vessel, and the solution was heated to 38° C.

The dispersion of lime was then poured into the casein solution under vigorous mixing. When the colloid had been emulsified, the speed of stirring was decreased, while the temperature was maintained at about 38° C. (±1°).

After 1 hour, 30 minutes, when the solvent had evaporated, the mixture was filtered on sintered glass No. 3, the pore diameter of which ranged from 15 to 40 μm (marketed by Prolabo), or it was left for decantation at ambient temperature. After the product was washed with water, a rapid wash with HCL (N/10) was carried out, followed by an additional wash with water.

The microcapsules obtained contained approximately 30% of Ca(OH)$_2$ and measured from 10 to 150 μm in size. The encapsulated accelerator thus obtained was designated C$_1$.

EXAMPLE 2

10 g of PVC/PVDC copolymer IXAN ® SGA/1, marketed by SOLVAY, were dissolved in 100 cm$^3$ of dichloromethane. 1.6 g of emulsifier (Soprophor ® 3D33, marketed by Soprosoie) were added.

When the solution was ready, 10 g of lime were homogeneously dispersed therein, and methanol was added drop by drop (100 cm$^3$ over the course of 2 hours) under vigorous stirring to precipitate the polymer.

The mixture was gently heated under a stream of nitrogen to evaporate the dichloromethane. It was filtered on sintered glass No. 3 and rinsed with methanol.

The capsules obtained measured from 10 to 100 μm in size and contained 50.6% of lime. The accelerator thus obtained was designated C$_2$.

EXAMPLE 3

10 g of PVC/PVDC copolymer were dissolved in 100 cm$^3$ of acetone. 10 g of lime were added and the mixture was homogenized. Precipitation was induced by dropwise addition, under vigorous stirring, of 100 cm$^3$ of water containing 2% of Tetronic ® 908, marketed by Marles Kuhlmann Wyandotte (MKW).

The mixture was filtered on a No. 3 sinter. The product was rinsed twice with 50 g of methanol and dried in a stream of air.

The microcapsules obtained contained approximately 50% of lime and measured from 10 to 100 μm in size.

The accelerator thus obtained was designated C$_3$.

EXAMPLE 4

A composition G$_1$, which hardened to the elastomeric state even at ambient temperature, was prepared by mixing the following constituents:
(1) 100 parts of an α,ω-di(hydroxy)dimethylpolysiloxane oil having a viscosity of 4,000 mPa.s at 25° C.;
(2) 20 parts of a pyrogenic silica having a specific surface of 200 m$^2$/g;
(3) 20 parts of ground quartz having an average particle diameter of 5 microns;
(4) 20 parts of titanium dioxide of rutile type, having an average particle diameter of 8 microns;
(5) 1 part of an α,ω-di(hydroxy)methylphenylpolysiloxane oil having a viscosity of 350 mPa.s at 25° C.; and
(6) 6 parts of methyl(triacetoxy)silane.

This composition G$_1$ was dispersed in 72 parts of dry cyclohexane. A homogeneous dispersion D$_1$ was thus obtained which contained substantially 70% of the composition G$_1$. This dispersion was stored in moisture-proof aluminum containers; the dispersion exhibited no change in appearance after 6 months of storage.

In addition, 3 pastes E$_1$, E$_2$ and E$_3$ were prepared, each containing a microencapsulated hardening accelerator C$_1$, C$_2$ and C$_3$, prepared according to Examples 1 to 3.

The compositions of these 3 pastes were as follows:
E$_1$: 100 parts of D$_1$ and 2.5 parts of C$_1$ (equivalent to 0.75 g of lime)
E$_2$: 100 parts of D$_1$ and 2.5 parts of C$_2$ (equivalent to 0.8 g of lime)
E$_3$: 100 parts of D$_1$ and 2.5 parts of C$_3$ (equivalent to 1.2 g of lime).

A control paste E$_0$ was prepared in which the accelerator was the same lime as that of Examples 1 to 3, but which was not encapsulated.
E$_0$: 100 parts of D$_1$; 0.64 parts of lime.

100 g of one of the 4 pastes E$_0$, E$_1$, E$_2$ and E$_3$ were introduced into a 500-cm$^3$ cylindrical plastic container; the contents of the container were immediately malaxated by means of a spatula, and this malaxation was continued for approximately one and a quarter minutes. The mixture was then rapidly poured into a 125-cm$^3$ cylindrical glass vessel equipped with a lid bored with 2 holes, one of the holes admitting the passage of a stream of dry nitrogen, the other hole permitting the insertion of the No. 7 spindle of a Brookfield viscometer.

After the lid was closed, the viscometer spindle placed in position and the dry nitrogen stream inlet connected, the viscometer spindle was rotated at a speed of 2.5 revolutions per minute. The delay between commencing the malaxation with the spatula and beginning rotation of the viscometer spindle was 2 minutes.

The development of the viscosity of the mixture present in the glass vessel was observed as a function of time, and rotation of the spindle was stopped when the reading on the viscometer dial showed a viscosity in the region of $16 \times 10^5$ mPa.s at 25° C.

In Table I below are reported the times necessary to reach a viscosity in the region of $16 \times 10^5$ mPa.s at 25° C.

TABLE I

| PASTE | | | | | | | |
|---|---|---|---|---|---|---|---|
| E$_0$ | | E$_1$ | | E$_2$ | | E$_3$ | |
| Time (min) | Viscosity (mPa · s) | Time (min) | Viscosity (mPa · s) | Time (min) | Viscosity (mPa · s) | Time (min) | Viscosity (mPa · s) |
| 0 | 18,500 | 0 | 37,800 | 0 | 15,000 | 0 | 40,000 |
| 5 | 45,500 | 60 | 48,000 | 30 | 18,000 | 60 | 43,000 |
| 6 | 32,500 | 120 | 62,600 | 150 | 25,500 | 120 | 43,500 |
| 7 | 158,000 | 180 | 88,000 | 210 | 32,500 | 180 | 43,500 |
| 8 | 324,000 | 420 | 144,000 | 270 | 48,000 | 240 | 43,500 |
| 9 | 750,000 | | | 330 | 76,000 | 360 | 43,500 |
| 10 | 1,800,000 | | | 390 | 150,000 | | |

It will be seen that, although the amount of lime introduced in E$_1$, E$_2$ and E$_3$ was much greater than in E$_0$, the development of viscosity was very markedly slowed in E$_1$ and E$_2$, relative to E$_0$, and was completely arrested in E$_3$.

EXAMPLE 5

Four (4) new compositions $F_0$, $F_1$, $F_2$ and $F_3$ were formulated by mixing the composition $G_1$, prepared in Example 4, with accelerator $C_0$, which consisted of the non-encapsulated lime identical to that used in Examples 1 to 3, and with encapsulated accelerators $C_1$, $C_2$ and $C_3$ prepared in Examples 1 to 3.

These $F_0$, $F_1$, $F_2$ and $F_3$ compositions are characterized in Table II below:

TABLE II

|       | $G_1$  | ACCELERATOR                                    |
|-------|--------|------------------------------------------------|
| $F_0$ | 100 g  | $C_0$: 0.64 g                                  |
| $F_1$ | 100 g  | $C_1$: 2.5 g equivalent to 0.8 g Ca(OH)$_2$    |
| $F_2$ | 100 g  | $C_2$: 2.5 g equivalent to 0.8 g Ca(OH)$_2$    |
| $F_3$ | 100 g  | $C_3$: 2.5 g equivalent to 1.2 g Ca(OH)$_2$    |

The compositions $F_0$ to $F_3$ were immediately spread to form a layer 4 mm thick on polyethylene plates. One batch of plates was placed in an oven at 40° C. or at 150° C. Although the silicone composition was slow to come to temperature, sufficient cross-linking, namely, a Shore A hardness > 40, was obtained within a fairly short time. The results are reported in Table III below. The time was measured from the moment the plates were placed in the heated enclosures.

TABLE III

|       | Oven at 100° C. |            | Oven at 150° C. |            |
|-------|-----------------|------------|-----------------|------------|
|       | Shore A hardness | time (min) | Shore A hardness | time (min) |
| $F_0$ |                 |            |                 |            |
| $F_1$ | 30              | 20         | 40              | 15         |
|       | 40              | 30         | 45              | 20         |
|       | 45              | 45         |                 |            |
| $F_2$ | 25              | 10         |                 |            |
|       | 45–50           | 15         |                 |            |
| $F_3$ | 40              | 15         |                 |            |
|       | 45              | 20         |                 |            |

From this Table III it is seen that, after the microcapsules had been made permeable by heat treatment at 100° C., the composition was converted into elastomers in less than 1 hour.

EXAMPLE 6

In this example, the compression set (CS) was measured according to ASTM Standard D395 Method B on the compositions $G_1$, $F_0$, $F_1$, $F_2$ and $F_3$ (compression 30% with the permanent deformation measured after 70 hours at 150° C.).

The results are reported in Table IV below:

TABLE IV

| Compositions | CS       |
|--------------|----------|
| $G_1$        | 40%      |
| $F_0$        | 30%      |
| $F_1$        | 10–30%   |
| $F_2$        | 110–120% |
| $F_3$        |          |

The results with $F_1$ were excellent. In contrast, the results obtained with $F_2$ and $F_3$ evidenced that the accelerator $C_2$ or $C_3$ must only be used in applications where the elastomer is maintained at a temperature which is not above ambient temperature.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A composition of matter comprising (A) 100 parts by weight of an $\alpha,\omega$-di(hydroxy)diorganopolysiloxane polymer having a viscosity of from 700 to 1,000,000 mPa.s at 25° C., which comprises diorganosiloxy recurring units of the formula $R_2SiO$, in which the symbols R, which may be identical or different, represent hydrocarbon radicals having from 1 to 8 carbon atoms, or substituted such hydrocarbon radicals bearing at least one halogen atom or cyano substituent, (B) 2 to 20 parts by weight of a cross-linking agent of the general formula:

$$R_pSi(OCOR')_{4-p'}$$

in which the symbol R is as defined above, the symbol R' represents a hydrocarbon radical devoid of aliphatic unsaturation and having from 1 to 15 carbon atoms and the symbol p represents zero or one, (C) 0.01 to 7 parts by weight, per 100 parts by weight of (A)+(B)+(C), of hardening accelerator therefor, said accelerator containing and/or generating water by chemical reaction when said accelerator is placed in contact with the polyacyloxysilane (B), and said accelerator being protectively microencapsulated within impermeable outer skin membranes adopted to be disrupted by thermal, irradiation or mechanical treatment to permit the release of said accelerator (C) therefrom and consequent curing of said composition.

2. The composition of matter as defined by claim 1, said outer skin membranes comprising polystyrene, an acrylonitrile/styrene copolymer, polyvinyl chloride, polyvinyl dichloride, a polyvinyl chloride/polyvinyl dichloride copolymer, ethylcellulose, cellulose nitrate, methyl polymethacrylate, an epoxide resin, a polysulfone, a polycarbonate or a polyimide.

3. The composition of matter as defined by claim 1, wherein said outer skin membranes are adopted to be disrupted by heating to a temperature of from 50° to 200° C.

4. The composition of matter as defined by claim 1, wherein said outer skin membranes are adopted to be disrupted by HF electromagnetic, microwave, infrared or ultraviolet irradiation.

5. The composition of matter as defined by claim 1, wherein said outer skin membranes are adopted to be disrupted by crushing or grinding.

6. The composition of matter as defined by claim 1, said microencapsulated hardening accelerator (C) having a particle size ranging from 5 to 200 μm.

7. The composition of matter as defined by claim 1, said accelerator (C) comprising an anhydrous or hydrated alkali or alkaline earth metal hydroxide, admixture of water and an alkali or alkaline earth metal phosphate and/or polyphosphate, or a sodium aluminosilicate having an adsorbed water content of from 5 to 15% by weight.

8. The composition of matter as defined by claim 1, further comprising (D) from 1 to 150 parts by weight of an inorganic filler material per 100 parts by weight of said polysiloxane (A).

9. The composition of matter as defined by claim 1, wherein said constituents (A) and (B) comprise the devolatilized reaction product of the stoichiometric reaction between (A) and (B).

10. The composition of matter as defined by claim 1, comprising a one-component, storage stable formulation.

11. The composition of matter as defined by claim 1, comprising a two-component formulation, one of said components which comprises said microencapsulated accelerator (C).

12. The composition of matter as defined by claim 1, further comprising an organopolysiloxane modifier.

13. The composition of matter as defined by claim 1, diluted in an inert organic liquid.

* * * * *